July 10, 1962 W. H. MORRIS ETAL 3,043,885
MANUFACTURE OF TRINITROTOLUENE
Filed April 20, 1960
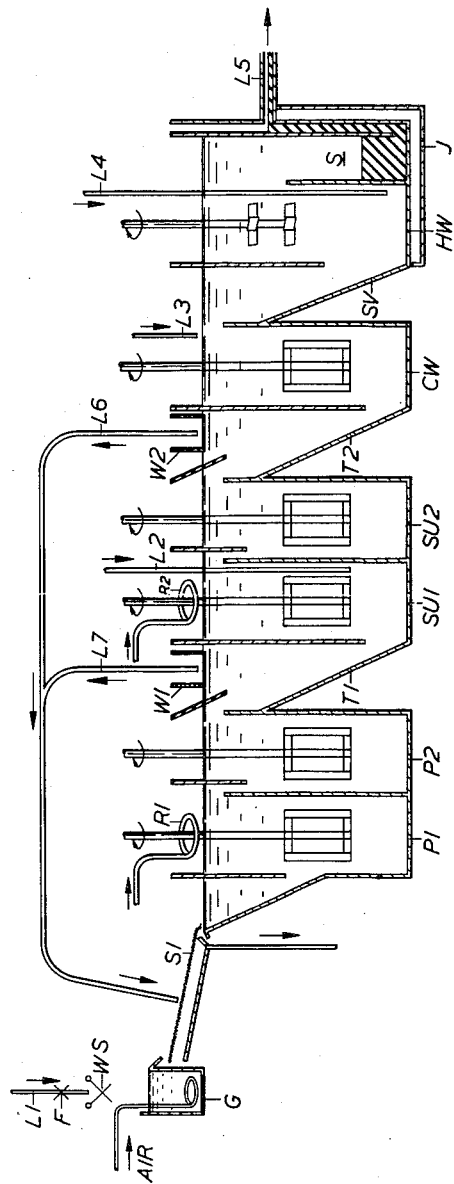
Inventors,
William H. Morris
John H. Hopkins
By S. J. Rotondi & A. J. Dupont
Attorneys.

3,043,885
MANUFACTURE OF TRINITROTOLUENE

William Haydn Morris, Pembrey, and John Hubert Hopkins, Burry Port, Wales, assignors to the Minister of Aviation in Her Majesty's Government of the United Kingdom of Great Britain and Northern Ireland, London, England
Filed Apr. 20, 1960, Ser. No. 23,468
3 Claims. (Cl. 260—645)

Crude TNT (trinitrotoluene) manufactured by the normal nitration methods is a mixture of TNT isomers. Approximately 95% of the mixture is the 2:4:6 isomer, and it is the practice to isolate this isomer from the mixture by various purification methods, a common method being the removal of the unwanted isomers as water soluble sulphonates by treatment with an aqueous solution of sodium sulphite.

The purification process may be carried out on the crude TNT in the solid or the molten state. Purification in the solid state involves the preparation of the washed molten crude TNT from the trinitration process into suitably sized particles. This is normally brought about by crystallisation in water, usually under carefully controlled temperature conditions which ensure slow transition between the liquid and the solid state. This method does not lend itself readily to a continuous process and has been normally used in batch purification methods only.

Purification of the TNT in the molten condition is a simpler and more direct method which may be applied to a continuous process. The method has, however, the disadvantages of loss of a relatively large amount of the 2:4:6 isomer and the necessity for the addition to the reaction of a buffering agent, such as boric acid, for the production of a product of high quality, that is a product having a setting point greater than about 80.4° C.

TNT particles of suitable size (not greater than about 1 mm. diameter) may be prepared fairly readily by continuous processes using rapid cooling methods, but this material is less readily purified, and with a greater 2:4:6 isomer loss, than particles prepared by slow cooling methods, which probably bring the unwanted isomers to the surface of the particles as a low melting eutectic mixture. Various methods of continuous granulation or crystallisation involving a slow cooling method are only partially successful due to aggregation of the particles during the slow cooling process, and an accumulation of material on the inner surfaces of the granulating vessel.

We have now discovered a treatment whereby TNT particles prepared, for example, by any suitable rapid cooling method, may be suitably purified.

In accordance with the present invention, a TNT purification process involves a treatment which is hereinafter called the post-warming treatment which consists in heating up in a fluid crude TNT particles, which may have been prepared by a rapid cooling method, and maintaining them at a temperature within 1°–12° C. below the setting point of the crude TNT in that fluid for a period of five minutes or longer. The setting point of the crude TNT is less than that of the purified 2:4:6 trinitrotoluene and depends upon its nature and the fluid it is in. In water, for example, the setting point will generally lie between 73° and 76° C. and can be even lower in other fluids. However, the TNT particles become transformed into a single plastic mass at a temperature of about 1° C. below their setting point in the particular fluid so that the temperature must be kept below this value. The post-warming treatment is preferably carried out at a temperature between about 4° and 9° C. below the setting point of the crude TNT, and the fluid is preferably maintained at a temperature in this range for at least 10 minutes and not more than about 20 minutes.

This post-warming treatment may be employed either as a preparatory stage which renders the TNT particles in a suitable state to be purified or the treatment may be applied as a modification to the purification process in which the crude TNT particles are raised to the post-warming temperature when in a purifying fluid, for example, a sodium sulphite solution or a solvent such as nitric acid. The loss of 2:4:6 trinitrotoluene may be somewhat higher when a solvent is used, but the solvent and the unsymmetrical TNT isomers may both be recovered by distillation.

When the post-warming process is employed as a preliminary stage, good results are obtained when particles having an optimum size about 1 mm. diameter are heated in water to within a temperature range of 66°–70° C., which is maintained for a period of not less than 12 minutes. Care has to be taken during the post-warming treatment to avoid local overheating otherwise aggregation of the particles may occur. When the post-warming treatment is carried out in water the presence of a little sodium sulphite, preferably 0.5 part but up to about 3 parts of crystalline sodium sulphite per 100 parts of crude TNT, is advantageous in that it will reduce the tendency to aggregation, particularly at temperatures between 70° C. and the setting point of the wet crude TNT.

Following previous post-warming treatment, the purification treatment may be either by chemical means such as with sodium sulphite or by physical means by using a solvent to dissolve or leach away the unsymmetrical trinitrotoluene isomers from the particles. For example, the TNT particles may be purified in nitric acid of about 60–80% by weight concentration. Other solvents may be used, for example, acetone, kerosene, benzene, carbon tetrachloride, and sulphuric acid, but in general the results are not so good as when nitric acid is used. The post-warming treatment may be applied with advantage to either a batch or a continuous process, produces crude TNT particles which can be readily purified to the 2:4:6 isomer without the addition of a buffering agent, and enables purification to be carried out with a very small loss of the 2:4:6 isomer.

Thus in the various processes for producing TNT of a high degree of purity to a dry setting point of about 80.6° C., the 2:4:6 isomer loss is usually about 4% when sulphiting in the molten state with boric acid as a buffering agent, and is usually more than 2% when sulphiting in the solid state; while by sulphiting in the solid state when using the post-warming treatment the loss may be reduced to about 1%. Furthermore, the crystalline sodium sulphite usages are respectively about 14, 10 and 7 parts per 100 parts of crude TNT for the three processes.

For a less pure trinitrotoluene of dry setting point about 80.2° C. the 2:4:6 isomer loss is usually about 2.4% when sulphiting in the molten state, more than 1% when sulphiting in the solid state and about 0.1% or less when sulphiting in the solid state after previous post-warming treatment and the crystalline sodium sulphite usages are respectively about 10, 8 and 5 parts for the three processes.

By way of example, a particular continuous process for the purification of crude TNT which employs the post-warming treatment in accordance with the invention will now be described.

The TNT granules are prepared for the post-warming treatment by a rapid cooling process by passing crude molten TNT in a continuous stream through the apex of a conical water spray. The spray is produced by a circular water main having a single ring of perforations at an angle such that the spray meets in a cone below the ring. The granules so formed, together with the cooling water, are allowed to fall into an air agitated vessel. The granules are removed continuously in the overflow.

which is either filtered, or allowed to settle, for separation of the granules. This cooling step eliminates the need for crushing or grinding, as a high percentage of the granules formed are within the size range requirement for optimum sulphiting conditions, that is smaller than 22 B.S. sieve. A lower size limit, which is taken to be 200 B.S. sieve, is also desirable for separation purposes.

For various TNT output rates the best results are obtained with a granulation water feed of the order of 20% to 25% above the minimum required for continuous operation. In general an increase in the water feed results in an overall decrease in the particle size.

Measurements of the overall temperature of the granulated TNT show that the inside of each granule is at a much higher temperature than the outer surface. Thus as the granules appear to be quite hard and set on the outer surface, it is apparent that the centre of each granule consists of TNT which is still in the molten condition. The granulating action of the ring water spray is therefore to break up the molten TNT stream by the force of the water spray into small molten granules, and to solidify the outer surface of the molten granules. The solidification is comparatively slow, and is completed in the water of the receiving vessel.

After granulation by rapid cooling, the TNT is then re-heated by the post-warming treatment. A temperature range of 66–70° C., maintained for at least 10 minutes, is suitable when the post-warming treatment is carried out in water. Some aggregation of particles occurs at 70° C., severe aggregation at 72° C. and the particles become transformed into a single plastic mass at a temperature of 74° C. The temperature range can be increased by carrying out the treatment in a weak solution of sodium sulphite, presumably because of the removal of some of the unsymmetrical TNT isomers from the surface of the particle. In this case the temperature range is extended to 72° C., only negligible aggregation occurring right up to the formation of the plastic mass condition at 74° C.

The working temperature range is considered to be 66–70° C. for water and 66–72° C. for sulphite solution and the optimum contact time for the treatment between 10 and 15 minutes.

The post-warming treatment may be carried out continuously under these conditions. A continuous measured liquid feed may be maintained by means of a calibrated flowmeter, whilst the TNT granules are fed continuously at a constant rate so that the post-warming contact time is 12 to 15 minutes. As local heating causes severe aggregation of the TNT granules it must be avoided. The temperature may be maintained by recirculating part of the liquid effluent and the addition of some hot water, preferably applied as a spray to the liquid surface.

The residual acidity of the TNT is considerably reduced during the post-warming treatment. Also without the post-warming treatment, the rise of the set point temperature of the granules on sulphiting at temperatures below about 55° C. is comparatively small.

The optimum sulphiting conditions for this material after a standard post-warming treatment for a product having a dry set point at about 80.3° C. occur when the sulphiting temperature is about 40° C. and 5 parts of crystalline sodium sulphite $Na_2SO_3.7H_2O$ are used per 100 parts of crude TNT for a contact time of about 20 minutes. Similarly, for a purer product having a dry set point at approximately 80.6° C., a minimum sulphiting temperature requirement of about 55° C. is required, correlated with a minimum reaction time of 30 minutes, and a crystalline sodium sulphite usage of 7 parts per 100 parts of crude TNT. There is a danger of "over-sulphiting," from the presence of unused sulphite in the spent sulphite liquor, if the hot washing were carried out without a prior cold water wash. The post-sulphite washing is therefore preferably carried out using a combination of cold and hot water washing.

A 2:1 ratio, water:TNT by volume, is adequate for both the cold and hot water washings. The contact time requirements, for poor conditions of agitation, are less than one minute and less than two minutes respectively. To the contact time for the hot water a further period of about three minutes is needed for the melting operation making a total contact time of approximately five minutes. Very little or no further improvement in color can be obtained by further washing.

A design of a plant to carry out a continuous process of the lines which have now been described is shown diagrammatically in vertical cross-section in the accompanying drawing. It is a simple arrangement which, after the granulating and separator stages, operates at one level. The washed crude TNT is gravitated by a jacketed pipe line L1 from a constant level tank and is fed into a ring water spray WS through a flowmeter F. The semi-solid TNT droplets and water from the sprays fall into the granulating vessel G where the outer surface of the droplets solidify to form granules of TNT. Both granules and water overflow over a mechanically vibrated sieve S1 where the water is separated off and the granules pass forward into an agitated post-warming vessel P1. This is maintained at 68° C. by means of hot water at about 98° C., delivered through a ring jet distributor R1, as a spray over the liquid surface. The slurry from the vessel P1 passes over a weir which is below the liquid level, and is directed by a baffle arrangement to the base of a second post-warming vessel P2. The TNT granules are passed on from the vessel P2 to an inclined base thickener vessel T1, where separation of most of the post-warming water takes place. The TNT granules are directed by the sloping base of the thickener vessel, through a slot, into the first of two agitated sulphiting vessels SU1 and SU2, into which a continuous measured feed of sodium sulphite solution is also introduced from a pipe L2. The required sulphiting temperature is again maintained by the addition of hot water at about 98° C., which is applied through a ring spray distributor R2 as a spray to the surface of the first sulphiting vessel. Further separation in a second thickener T2 then takes place in order to remove spent-sulphite liquid.

The TNT granules are driven forward through the plant by the combined effect of gravity and agitation. The movement of the liquid media is controlled by means of an adjustable weir W2 on the thickener T2. The weir W1, on the thickener T1, is fixed. By adjustment of the level of the adjustable weir W2 the flow of liquid from the thickeners T1 and T2 can be controlled, so that either a small quantity of liquid passes from thickener T1 to the next vessel or vice versa, whichever is desired. Once set, further adjustment of the adjustable weir should not be necessary, even for big alteration in the output rate, provided that the feed ratios are maintained at approximately the same value.

The granules pass on from the thickener T2 into an agitated cold water washing vessel CW into which a feed of cold water is fed from a pipe L3, and thence into a settling vessel SV which is of similar design to the thickener vessels but with no overflow weir. From this vessel the TNT granules pass into an agitated hot water and melting vessel HW. Steam is fed to this vessel through the pipe line L4. Sufficient hot water for the hot water wash is supplied from the steam condensate.

The operation of the cold and hot water washing section is counter-current. The hot water from the hot water washing vessel HW passes backwards up the settler vessel SV against the downward flow of TNT granules, through the cold water washing vessel CW and, together with the cold water washing liquid, up the thickener T2, to overflow with the spent-sulphite liquid at weir W2. In this way the settling vessel SV functions as a simple counter-current spray column, whilst thickener T2 functions partly as a thickener or separator and partly as a spray column.

Water should be supplied to the cold water washing vessel CW at a sufficient rate to prevent melting of the TNT granules in this vessel. A cold water feed of equal rate by volume to the TNT input, together with the hot water wash from the steam distillate, is sufficient for adequate TNT washing using this counter-current method, whereas a 2:1 ratio, water:TNT by volume was necessary for separate cold and hot water washing operations.

The molten TNT from the hot water washing vessel HW passes into the baffled separating vessel S, purified TNT being discharged through an outlet pipe L5. The vessel S is surrounded by a hot water jacket J.

The inclination of the base of the various thickening and settling vessels should not be less than 30 degrees, the critical angle of slip for TNT granules on mild steel under water. Also the supply of water to the thickeners should be less than the critical water velocity for settling of TNT particles of about 200 B.S.S. which is equivalent to 200 gallons/hour/square foot of thickener cross-section.

The replacement of the mechanically agitated sieve by a thickener similar to thickeners T1 and T2 is not advisable because, at this state, the TNT granules tend to form loose aggregates with attached air bubbles at temperatures around 30° C., which settle only with difficulty. Using one of these thickeners at this stage aggregates form at the slot entrance in T1, where the cold granules meet hot water from vessel P1, resulting in poor separation. At temperatures below 20° C. the TNT granules in agitated water remain quite separate, giving good separation, while at about 50° C. the aggregates become more dense, without air bubbles, and the separation becomes reasonably good. The effect is reversible.

In the drawing, the effluents from the thickeners T1 and T2 are shown as being returned along pipes L6 and L7 to the mechanical sieve for further separation, should this be necessary. Several alternatives are possible. The post-warming effluent from the thickener T1 may be passed through a heat exchanger and returned to the first post-warming vessel P1. In this case, a small sulphite feed must also be fed to the vessel P1 to neutralise any remaining acid washed out of the TNT at this stage, and this will have the added advantage of increasing the operating temperature range of this vessel from 66° C.–70° C. to 66° C.–72° C. as previously stated.

If sufficiently free from suspended TNT particles the cold water from the granulating process, which separates out at the sieve separator, may be reused for the cold water washing operation in the vessel CW.

The plant shown in the drawing may be modified by carrying out the cold and hot water washing operations separately with separation of the wash water in the settling vessel SV and the separator S. In this case the settling and separator vessels have adjustable weir attachments and function as thickeners. The washing however is less efficient by this method, and a 2:1 ratio water:TNT by volume is necessary for both washes in order to obtain TNT virtually free from spent-sulphite liquor contamination.

We claim:

1. A continuous process for purifying crude 2,4,6-trinitrotoluene particles which comprises warming said particles to a temperature of 1° to 12° C. below the setting point of said particles for at least five minutes, treating said particles with a sodium sulphite solution, washing said particles in cold water, melting said particles, and removing the purified molten trinitrotoluene.

2. A continuous process for purifying crude 2,4,6-trinitrotoluene particles comprising warming said particles in a water bath to a temperature of 1° to 12° C. below the setting point of said particles for at least five minutes, treating said particles with a solvent from the group consisting of acetone, kerosene, benzene, carbon tetrachloride, sulphuric acid, and nitric acid whereby unsymmetrical trinitrotoluene isomers are removed, washing said particles in cold water, melting said particles, and removing the purified trinitrotoluene.

3. A continuous process for purifying crude 2,4,6-trinitrotoluene particles by treating said particles with a sodium sulphite solution, washing said particles in cold water, melting and removing the purified trinitrotoluene, the improvement comprising warming said particles to a temperature of 4° to 9° C. below the setting point of said particles for a period of 10 to 20 minutes immediately preceding introduction into said solution.

References Cited in the file of this patent

UNITED STATES PATENTS

| | | |
|---|---|---|
| 1,975,598 | Davies et al. | Oct. 2, 1934 |
| 2,126,162 | Wylen | Aug. 9, 1938 |
| 2,132,845 | Castner et al. | Oct. 11, 1938 |